United States Patent [19]
Yip et al.

[11] Patent Number: 5,661,731
[45] Date of Patent: Aug. 26, 1997

[54] METHOD FOR SHRINKING A CLOCK CYCLE WHEN TESTING HIGH SPEED MICROPROCESSOR DESIGNS

[75] Inventors: Chung Yin Joseph Yip; Marc E. Wegman, both of Beaverton, Oreg.

[73] Assignee: Intel Corporation, Santa Clara, Calif.

[21] Appl. No.: 672,101

[22] Filed: Jun. 27, 1996

[51] Int. Cl.$^6$ .............................. G06F 1/04; G01R 31/28
[52] U.S. Cl. .............................................. 371/22.1; 395/556
[58] Field of Search ................. 371/21.1, 27; 364/934.2, 364/934.3, 934.71; 395/551, 555, 556

[56] References Cited

U.S. PATENT DOCUMENTS 5,077,686  12/1991  Rubinstein .............................. 395/556

Primary Examiner—Hoa T. Nguyen
Attorney, Agent, or Firm—Blakely, Sokoloff, Taylor & Zafman

[57] ABSTRACT

A method for increasing the frequency of a particular clock cycle for a driven clock signal. The driven clock signal can be used to synchronize data transmission between circuit elements of a microprocessor. Accordingly, the particular clock cycle, with the increased frequency, will exercise a subset of the microprocessors circuit elements based on the instructions set being executed by the microprocessor. This timing method facilities speed path analysis for complex and high speed microprocessor designs.

11 Claims, 4 Drawing Sheets

METHOD FOR SHRINKING A CLOCK CYCLE WHEN TESTING HIGH SPEED MICROPROCESSOR DESIGNS

FIELD OF THE INVENTION

The present invention relates to generating clock signals for speed path analysis, and more particularly, to a method for reducing the period of a clock cycle to detect speed path failures in high speed microprocessor designs.

BACKGROUND OF THE INVENTION

Isolation testers are often used to test and debug critical speed paths on newly designed microprocessors. An isolation tester is typically connected to the microprocessor and generates a test clock used to drive the functional units within the microprocessor. The functional units typically include the datapath, the cache, the input/output (I/O) units, . . . etc.

A prior art method of testing the microprocessor requires increasing the frequency of the test clock applied to the functional units until the design fails. The design typically fails because as the clock frequency is increased, the time allotted for a signal to traverse between synchronized nodes is shortened. Accordingly, the signal does not reach the synchronized node in time and the microprocessor fails to execute an instruction successfully, resulting in a general system failure.

Thorough analysis of the microprocessor's general system failure one could determine in which clock cycle the microprocessor failed and accordingly the instruction(s) and the functional unit(s) responsible for the failure. This standard testing design is quite effective for microprocessors with a slow operating frequency, a limited number of signal paths, and a limited number of instructions.

However, as the operating frequency and the available number of instructions is increased in next generation designs, it becomes more difficult to isolate and detect specific speed paths within the microprocessor.

FIG. 1 shows a tester system according to the prior art. Test system 100 comprises a TESTER 110 coupled to a MICROPROCESSOR 130 along signal line TESTCLOCK 120. The signal TESTCLOCK 120 is used to propagate the test clock into MICROPROCESSOR 130. It will be appreciated by one skilled in the art that this simple design allows testing of MICROPROCESSOR 130 without a dependency on the internal phase locked loop (PLL), typically used to drive the internal clocks of MICROPROCESSOR 130. Detection of speed paths in currently designed microprocessors, however, is difficult to achieve due to the technological limitations found in TESTER 110 and the complexity introduced in current microprocessor designs.

More specifically, TESTER 110 is constrained by two technological limitations. TEST SYSTEM 100 is unable to change clock speed during testing, and TEST SYSTEM 100 is unable to generate a test clock that exceed a clock frequency of 200 megahertz (MHz), which produces a microprocessor clock of 100 MHz. The halving of the tester clock speed before generation of the microprocessor clock is a byproduct of the clock divider circuitry which is typically used in microprocessor designs to divide the PLL generated clock before an internal microprocessor clock is generated. Accordingly, new microprocessor designs that operate in frequencies above 100 MHz can not be tested at their typical operating frequencies utilizing TESTER 110.

Further, current microprocessor designs contain new features such as fractional speed busses and dual pipe-line architecture which make debugging of a speed path based on a general test clock frequency impractical. This impracticality arises because the complexity of the design blurs the correlation between a failure, the exact cycle of failure, and the instruction that caused the failure.

For example, the complexity in current microprocessor designs means that a failure in cycle number one thousand could have possibly occurred any where during the past 200 cycles from a multitude of possible instructions that are being executed in parallel through one of two pipe-lines and thousands of transistors. Because current isolation testers are impractical for speed path analysis on next generation microprocessor designs, it would be desirable to have a tester system that can selectively increase the clock frequency for a particular clock cycle, while maintaining a slower frequency for all other cycles.

SUMMARY OF THE PRESENT INVENTION

A method for reducing the period of a particular clock cycle is described that generates a test clock suitable for testing high speed microprocessor designs. The method comprises generating a first clock signal and dropping a first clock cycle from the first clock signal. Additionally, a pulse signal is generated following the dropped first clock cycle during a second clock cycle of the first clock signal. The pulse signal transitions from a low voltage to a high voltage during a high voltage level of the second clock cycle, and transitions from a high voltage to a low voltage during a low voltage of the second clock cycle. The pulse signal and the first clock signal with the dropped first cycle, are combined to generate a third clock signal. The third clock signal follow, s the first clock signal except during the second clock cycle of the first clock signal wherein the third clock signal includes two clock cycles, each clock cycle having a period in length that is a fraction of the period length found in the first clock signal. The third clock signal is used to test the high speed microprocessor.

The method allows increasing the frequency of the first clock for a particular cycle. It will be appreciated by one skilled in the art that the particular cycle has a period in length that is any fraction of the first clock signal, allowing a wide range of high speed frequencies. It will further be appreciated by one skilled in the art that the proscribed method can be implemented through hardware or software.

Other features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method for increasing the frequency of a particular clock cycle in a test clock is described. As shown by the timing diagram of FIG. 2, CLK0 is a typical clock signal, generated by a test system, with a fifty percent duty cycle. The method describes the steps to generate clock signal TEST CORE CLK from CLK0, wherein TEST CORE CLK, a derivative of XORCLK, follows the CLK0 signal except between time periods $t_2$ and $t_5$ where TEST CORE CLK has a clock frequency that is double its normal clock frequency.

Figure 1:
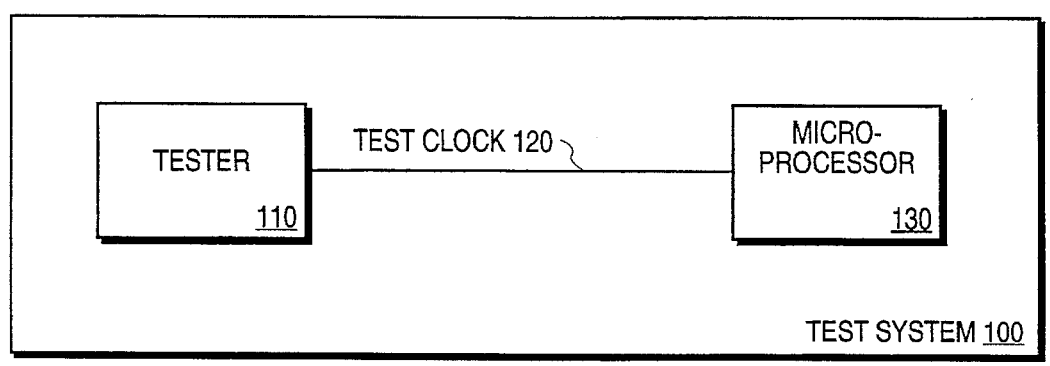
FIG. 1 is an illustration of a prior art implementation of a tester circuit for use in detecting speed path failure in a processor.
Figure 2:
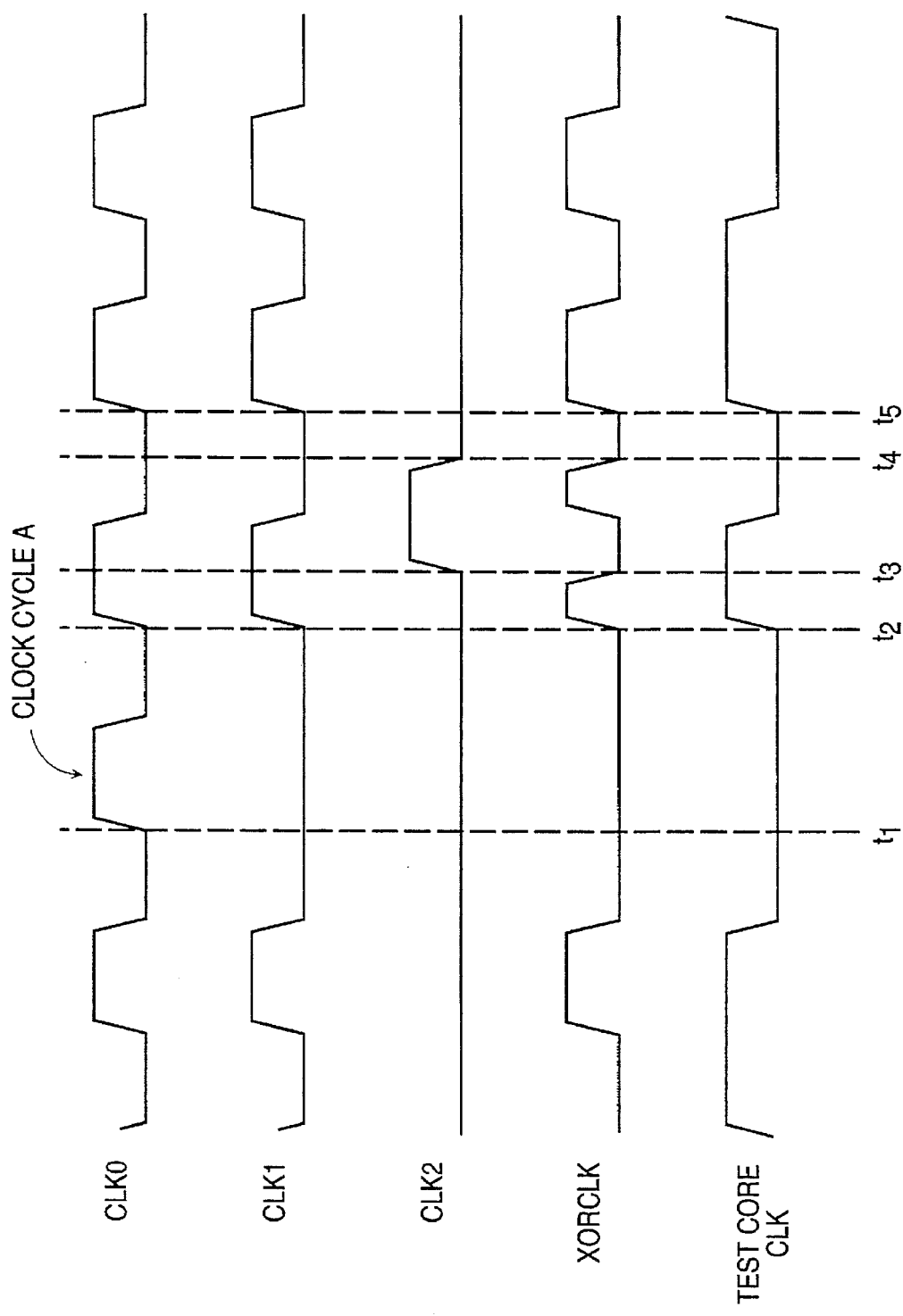
FIG. 2 is an illustration of the timing pattern utilized for test clock generation according to one embodiment of the present invention.

FIG. 2 further illustrates that at time $t_1$, CLOCK CYCLE A is dropped from the wave form of CLK0 resulting in clocking signal CLK1. FIG. 2, also shows the generation of pulse signal CLK2. CLK2 has a low to high transition at time period $t_3$ and a high to low transition at time period $t_4$. Time period $t_3$ and $t_4$ being the midway points of signal CLKI's high and low voltage levels respectively. CLK1 is then combined with generated signal CLK2 to form XOR-CLK. It will be appreciated by one skilled in the art that this combination could be performed through the use of an exclusive or gate. As shown in FIG. 2, CLOCK CYCLE A is dropped from CLK0 before generation of CLK1 because the combination of CLK2 and CLK1 creates an additional clock cycle between point $t_2$ and $t_5$ of signal XORCLK. Accordingly, the removal of CLOCK CYCLE A prior to the derivation of XORCLK results in XORCLK maintaining the same number of cycles as CLK0. Maintaining the same number of cycles allows direct correlation between the test clock, CLK0, and the internal microprocessor clocks. XOR-CLK is then transformed into CORE CLOCK through a prior art clock divider circuitry. In another embodiment, the signals CLK0 and CLK2 could have been combined without removal of a clock cycle until after the generation of signal XORCLK.

It will be appreciated by one skilled in the art that a TEST CORE CLK with a higher frequency ratio than 2:1 for a particular cycle could be derived from CLK0 by varying the transition points and duration of signal CLK2. It will also be appreciated by one skilled in that art that dropping additional cycles from CLK0 and increasing the number of pulses in CLK2 will result in a plurality of clock cycles with an increased frequency.

Figure 3:
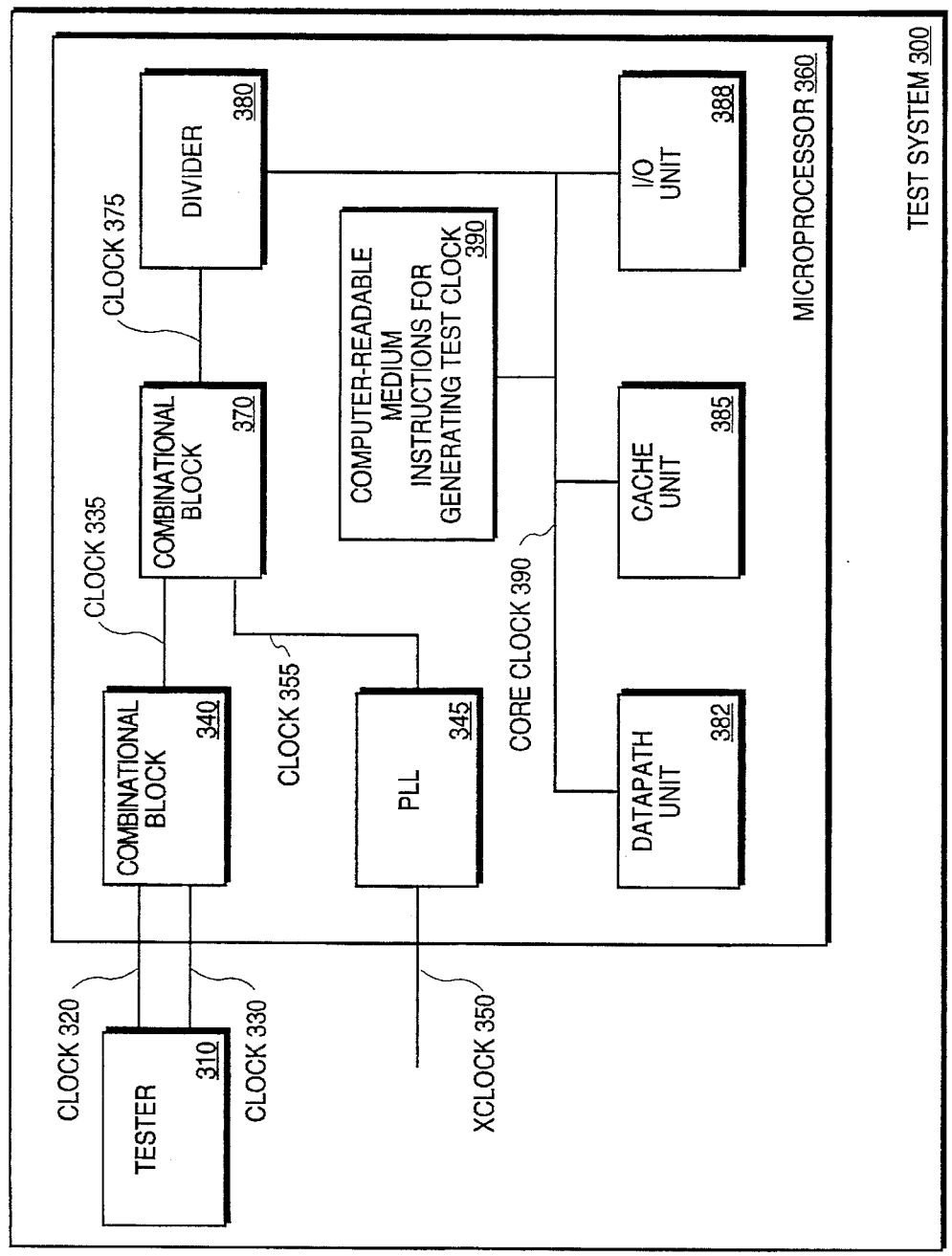
FIG. 3 is an illustration of a tester circuit generating a test clock for use in detecting speed path failure in a high speed processor according to one embodiment of the present invention.
Figure 4:
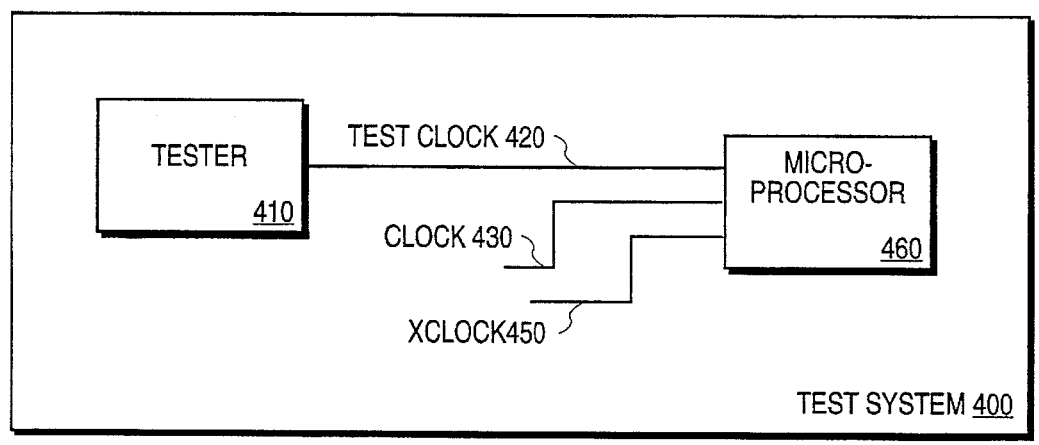
FIG. 4 is an illustration of a tester circuit for detecting speed path failure in high speed processors utilizing a different source to generate the triggering signals to increase the frequency for a particular cycle according to one embodiment of the present invention.

While diagrams representing certain embodiments of the present invention are illustrated in FIGS. 3 and 4, these illustrations are not intended to limit the invention.

FIG. 3 shows a TEST SYSTEM 300 according to one embodiment. TEST SYSTEM 300 comprises a tester circuit TESTER 310 coupled to MICROPROCESSOR 360 via signal lines CLOCK 320 and CLOCK 330. TESTER 310 utilizes signal lines CLOCK 320 and CLOCK 330 to transmit a test clock signal and a pulse signal to LOGIC BLOCK 340 within MICROPROCESSOR 360. An illustration of the test clock signal and the pulse signal is shown in signals CLK0 and CLK 2 of FIG. 2.

LOGIC BLOCK 340 utilizes the test clock signal and the pulse signal to generate the XORCLK signal of FIG. 2. LOGIC BLOCK 340 then transmits the XORCLK signal along signal line CLOCK 335 to LOGIC BLOCK 370. The output of LOGIC BLOCK 340 is a derivative of the test clock, wherein a particular period, equal in length to the period of the test clock, has double the transitions of the test clock. It will be appreciated by one skilled in the art that changing transition and duration of the pulse clock signal will increase the number of transitions generated by LOGIC BLOCK 340 for the particular period. Moreover, the steps performed by the LOGIC BLOCK 340 to generate the XORCLK could alternatively be provided, at least in part, as a computer program product which may include a computer readable medium 390 having stored thereon instructions which can be used to program a computer to perform a process according to the present invention.

MICROPROCESSOR 360 also includes input XCLOCK 350. Unlike inputs CLOCK 320 and CLOCK 330, that have other functional uses during non-testing, input XCLOCK 350 is consistently used to provide a synchronization signal to MICROPROCESSOR 360 regardless of testing or non-testing. XCLOCK 350 is coupled to PLL 345 which generates a core clock signal along signal line CLOCK 355. During normal operation the core clock signal passes through LOGIC BLOCK 370 to DIVIDER 380, which divides the frequency of the core clock signal. DIVIDER 380 is typically used in the prior art to operate the core clock signal at a fraction of the clock frequency internal to PLL 345, resulting in a stable ratio between XCLOCK 350 and the generated core clock. Subsequent to the dividing of core clock's frequency by DIVIDER 380, the slower core clock signal is propagated to the MICROPROCESSOR 360's functional units along signal line CORECLOCK 390. This mass distribution of core clock allows MICROPROCESSOR 360 to synchronize data transmission among the functional units.

When using a test clock to test MICROPROCESSOR 360, LOGIC BLOCK 370 selects signal line CLOCK 335 instead of CLOCK 355. As a result, the output of LOGIC BLOCK 340 is sent to DIVIDER 380. DIVIDER 380 divides the frequency of the XORCLK creating a newly controlled test signal TEST CORE CLK, as illustrated by FIG. 2.

TEST CORE CLK is transmitted to the functional units DATAPATH UNIT 382, CACHE UNIT 385, and I/O UNIT 388 along signal line CORECLOCK 390. This mass distribution of TEST CORE CLK allows TEST SYSTEM 300 to synchronize data transmission among the functional units utilizing a clocking signal with a variable frequency for a particular cycle. For example, during testing, TEST SYSTEM 300 can supply MICROPROCESSOR 360 with a TEST CORE CLK of 100 MHz for all clock cycles except cycle 330 where TEST CORE CLK operates at a frequency of 200 MHz. This independent control allows TEST SYSTEM 300 to analyze whether the set of instructions and circuitry used by MICROPROCESSOR 360 at clock cycle 330 can operate at 200 MHz. Thus, by controlling the frequency of a particular cycle, TEST SYSTEM 300 allows the identification of the exact cycle of failure, the instruction that caused the failure, and the circuitry responsible for the failure.

FIG. 4 illustrates an alternative embodiment for testing a microprocessor, TESTER SYSTEM 400. Similar to TESTER SYSTEM 300, TESTER 410 is coupled to PROCESSOR 460 along signal line TESTCLOCK 420 and XCLOCK 450 is a direct input to PROCESSOR 460. The difference between TESTER SYSTEM 400 and TESTER SYSTEM 300 exists in the make up of TESTER 410. Unlike, TESTER 310 where the pulse and test clock signals were both generated internally by TESTER 310, TESTER 410 only generates a test signal and the pulse signal is generated externally for transmittal to PROCESSOR 460 along signal line CLOCK 430. This system presents two advantages. First, prior art testers circuits which only provided a test clock signal can still be utilized in TESTER SYSTEM 400 and second the pulse signal can be controlled manually or through the use of independent circuitry.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for increasing a frequency of a selected clock cycle for testing a circuit, the method comprising the steps of:

a. generating a first clock signal;
   b. dropping a first clock cycle from said first clock signal;
   c. generating a pulse signal during a second clock cycle of said first clock signal; and
   d. generating a third clock signal by combining said first clock signal and said pulse signal, said third clock cycle includes a third clock cycle and a fourth clock cycle, said third and fourth clock cycle each having a period in length shorter than said second clock cycle of said first clock signal, wherein remaining clock cycles of said third clock signal have a period in length equal to said second clock cycle of the first clock signal.

2. The method of claim 1 for increasing said frequency of a selected clock cycle for testing said circuit, wherein said pulse signal transitions from a low voltage to a high voltage during a high voltage level of said second clock cycle, and transitions from a high voltage to a low voltage during a low voltage of said second clock cycle.

3. The method of claim 1 for increasing said frequency of a selected clock cycle for testing said circuit, wherein said third clock signal synchronizes signal transmission within a microprocessor, said third and fourth cycle of said third clock signal for testing operation of the microprocessor by increasing frequency.

4. The method of claim 1 for increasing said frequency of a selected clock cycle for testing said circuit, wherein said step of dropping a first clock cycle further includes dropping n clock cycles from said first clock signal, where n>1;

in step (c) generating n pulse signals; and
   in step (d) generating said third clock signal following said first clock signal, wherein said third clock signal includes n clock cycles each having a period in length a fraction of said second clock cycle.

5. The method of claim 1 for increasing said frequency of a selected clock cycle for testing said circuit, wherein said pulse signal transitions occur at a midpoint of said first clock's high and low voltage levels and said third and fourth cycle of said third signal each have a period in length one half of said second clock cycle.

6. A computer system for testing functionality of a microprocessor comprising a tester circuit and a microprocessor, said tester circuit for generating a first clock and a second clock, said microprocessor comprising:

a plurality of input and output nodes including an external clock node, wherein a first input node is coupled to said first clock and a second input node is coupled to said second clock during testing of said microprocessor, said first and second input nodes having other functional use during normal operation;

a first logic block coupled to said first input node and said second input node, said first logic block for generating a combined signal clock; wherein said combined clock signal follows said first clock except for a single clock cycle, said single clock cycle having a frequency higher than said first clock;

a first circuit coupled to said external clock node, said first circuit for generating a third clock;

a second logic block coupled to said combined clock signal and said third clock; said second logic block for selecting between said combined clock signal and said third clock and generating a fourth clock signal; and a plurality of functional units including; a datapath unit, a cache unit, a bus unit, and a floating point unit, wherein each unit is coupled to said fourth clock signal and synchronizes signal transmission following said fourth clock signal.

7. The computer system of claim 6, wherein said second clock is generated via a second circuit.

8. The computer system of claim 6, wherein said first logic block is located external to said microprocessor and is coupled to said first clock and said second clock, said combined clock signal is coupled to said second logic block via said first input node, and said second input node is decoupled from said second clock.

9. A computer-readable medium having stored thereon a plurality of sequences of instruction, said plurality of sequences of instructions including sequences of instruction which when executed by a tester circuit, causes said tester circuit to perform said steps of:

a. generating a first clock signal;
   b. dropping a first clock cycle from said first clock signal;
   c. generating a pulse signal during a subsequent second clock cycle of said first clock signal; and
   d. generating a third clock signal by combining said first clock signal and said pulse signal, said third clock cycle includes a third clock cycle and a fourth clock cycle, said third and fourth clock cycle each having a period in length shorter than said second clock cycle of said first clock signal, wherein remaining clock cycles of said third clock signal have a period in length equal to said second clock cycle of the first clock signal.

10. The computer-readable medium of claim 9, having stored thereon a plurality of sequences of instruction, said plurality of sequences of instructions including sequences of instruction which when executed by a tester circuit, causes said pulse signal transitions from a low voltage to a high voltage during a high voltage level of said second clock cycle, and transitions from a high voltage to a low voltage during a low voltage of said second clock cycle.

11. The tester circuit of claim 9, including a processor for testing execution of a plurality of processor instructions by said processor, wherein said sequence of instructions cause said processor to utilize said third clock to synchronize execution of a subset of said plurality of processor instructions.

* * * * *

UNITED STATES PATENT AND TRADEMARK OFFICE
CERTIFICATE OF CORRECTION

PATENT NO.   :   5,661,731
DATED        :   August 26, 1997
INVENTOR(S)  :   Yip et al.

It is certified that error appears in the above-identified patent and that said Letters Patent is hereby corrected as shown below:

In column 2 at line 33 delete "follow,s" and insert --follows--

In column 3 at line 22 delete "CLKI's" and insert --CLK1's--

Signed and Sealed this

Twenty-fifth Day of August, 1998

Attest:

BRUCE LEHMAN

Attesting Officer

Commissioner of Patents and Trademarks